US007516138B2

(12) United States Patent
Bernal et al.

(10) Patent No.: US 7,516,138 B2
(45) Date of Patent: Apr. 7, 2009

(54) METHOD FOR OPTIMIZED PARAMETER BINDING

(75) Inventors: Margaret Ann Bernal, San Jose, CA (US); Christopher John Crone, San Jose, CA (US); Andrei Fedorovich Lurie, San Jose, CA (US); Daya Vivek, Edison, NJ (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 10/676,800

(22) Filed: Sep. 30, 2003

(65) Prior Publication Data

US 2005/0071346 A1    Mar. 31, 2005

(51) Int. Cl.
*G06F 17/00* (2006.01)

(52) U.S. Cl. .................................. 707/100; 707/200
(58) Field of Classification Search ................ 707/101, 707/2, 100, 200; 717/129
See application file for complete search history.

(56) References Cited

U.S. PATENT DOCUMENTS

| 5,875,334 | A | * | 2/1999 | Chow et al. | ................ | 717/141 |
| 5,875,442 | A | * | 2/1999 | Jordan et al. | ................ | 707/2 |
| 5,893,104 | A | * | 4/1999 | Srinivasan et al. | ................ | 707/102 |
| 6,185,556 | B1 | | 2/2001 | Snodgrass et al. | | |
| 6,249,783 | B1 | * | 6/2001 | Crone et al. | ................ | 707/2 |
| 6,339,772 | B1 | | 1/2002 | Klein et al. | | |
| 6,351,742 | B1 | * | 2/2002 | Agarwal et al. | ................ | 707/3 |
| 6,370,522 | B1 | * | 4/2002 | Agarwal et al. | ................ | 707/2 |
| 6,401,083 | B1 | * | 6/2002 | Agarwal et al. | ................ | 707/2 |
| 6,567,816 | B1 | * | 5/2003 | Desai et al. | ................ | 707/102 |
| 6,985,904 | B1 | * | 1/2006 | Kaluskar et al. | ................ | 707/101 |
| 2002/0029211 | A1 | | 3/2002 | Bonner et al. | | |
| 2002/0129035 | A1 | * | 9/2002 | Hayes et al. | ................ | 707/104.1 |

OTHER PUBLICATIONS

Whang et al., "Query Optimization in a Memory-Resident Domain Relational Calculus Database System", ACM Transactions on Database Systems, vol. 15 No. 1, [online] Mar. 1990 [retrieved on Oct. 10, 2008]. Retrieved from Internet: <URL:http://dblab.kaist.ac.kr/Publication/pdf/ACM90_TODS_v15n1.pdf>.*
Rao et al., "Reusing Invariants: A New Strategy for Correlated Queries", SIGMOD '98 Seattle, WA, USA p. 37-48 [online], Mar. 1998 [retrieved on Oct. 10, 2008]. Retrieved from the Internet: < URL: http://citeseerx.ist.psu.edu/viewdoc/summary?doi=10.1.1.50.5686>.*
IBM, Corp. *DB2 Universal Database for OS/390 and z/OS. Application Programming and SQL Guide. Version 7*, 1983, 2001 and 2002, pp. 1-1038.

(Continued)

*Primary Examiner*—John E Breene
*Assistant Examiner*—Dennis Myint
(74) *Attorney, Agent, or Firm*—Janaki K. Davda; Konrad Raynes & Victor, LLP

(57) ABSTRACT

Disclosed is a technique for input parameter binding. When executing a statement, data in an application structure of the statement is compared with optimization information in a bind-in structure. When there is a match between the data in the application structure and data in the optimization information in the bind-in structure, the statement is executed with the optimization information.

Also disclosed is a technique for output parameter binding. When executing a statement, data in an application structure of the statement is compared with optimization information in a bind-out structure. When there is a match between the data in the application structure and data in the optimization information in the bind-out structure, the statement is executed with the optimization information.

14 Claims, 11 Drawing Sheets

OTHER PUBLICATIONS

IBM, Corp. *DB2 Universal Database for OS/390 and z/OS. SQL Reference, Version 7*, 1982, 2001, pp. 1-1244.

IBM, Corp. iSeries. *DB2 Universal Database for iSeries SQL Reference, Version 5*, 1998 and 2002 pp. 1-1054.

* cited by examiner

SQLDAID = SQLDA
SQLDABC = 104
SQLN = 2
SQLD = 2
SQLTYPE[1] = 496
SQLLEN[1] = 4
SQLDATA[1] = x00001000
SQLIND[1] = x00002000
SQLNAME[1] = x'0008000000010004'
=x'0008000000020000'

SQLTYPE[2] = 496
SQLLEN[2] = 4
SQLDATA[2] = x00003000
SQLIND[2] = x00000000
SQLNAME[2]

SQLDAID = SQLDA
SQLDABC = 104
SQLN = 2
SQLD = 2
  SQLTYPE[1] = 496
  SQLLEN[1] = 4
  SQLDATA[1] = x00001000
  SQLIND[1] = x00002000
  SQLNAME[1] = x'0008000000010004'

METHOD FOR OPTIMIZED PARAMETER BINDING

BACKGROUND OF THE INVENTION

1. Field of the Invention

The present invention is related to optimized parameter binding (e.g., for application program parameters).

2. Description of the Related Art

A database system is one in which data is stored, retrieved, and processed. Data records in a database management system (DBMS) in a computer may be maintained in tables, which are a collection of rows all having the same columns. Each column maintains information on a particular type of data for the data records which comprise the rows. Tables in the database are searched using, for example, a Structured Query Language (SQL), which specifies search operations or predicates to perform on columns of tables in the database to qualify rows in the database tables that satisfy the search conditions.

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

In some systems, an application program passes information to a database system and receives information from the database system via an interface that specifies host variables, host variable arrays, parameter markers, and/or a user descriptor area. In some systems, the interface is a SQL descriptor area (SQLDA). A SQLDA is a control block that describes the data portion of an Application Programming Interface (API) between a local application program ("local application") and a DB2® Universal Database system (available from International Business Machines Corporation) and is used for execution of an SQL statement, such as an insert statement or a fetch statement. An insert statement provides values to be inserted into a table in the host variables. A fetch statement retrieves zero, one, or multiple rows from a table and assigns the values of the rows returned to host variables.

A host variable is a variable that is referred to by embedded SQL statements in a host (e.g., client) application program ("client application"). Host variables may be used in the application program to transmit data between tables in a database and application program work areas. A host variable array is an array in which each element of the array contains a value for the same column. For example, for an insert statement, the SQLDA provides a host variable array that holds values to be inserted into a table, and, for a fetch statement, the SQLDA provides a host variable array that is to be used to contain values from a row of a table. A parameter marker is a marker (e.g., a question mark ("?")) that appears in a statement string of a dynamic SQL statement. The parameter marker may appear where a host variable might appear if the statement string was a static SQL statement.

For more information on SQLDA, the insert statement, the fetch statement, or host variable structures, see DB2® Universal Database for OS/390® and z/OS®, SQL Reference Version 7, October 2002; DB2® Universal Database for OS/390® and z/OS® Application Programming and SQL Guide Version 7, October 2002; and DB2® Universal Database for iSeries SQL Reference Version 5, 2002; each of which is available from International Business Machines Corporation.

For multiple row inserts and fetches, some application programs insert or fetch one row of a table at a time, which increases execution costs. Some of the execution costs of an SQL statement to insert or fetch rows are incurred due to the DBMS determining the type of data present in the database and in the application program (e.g., an application program may describe data using a different type than the database), finding out whether the database needs to convert the data from one encoding scheme (e.g., ASCII, EBCDIC, or Unicode) into another encoding scheme or from one data type (e.g., decimal or integer) to another data type, checking whether data conversion is valid (e.g., whether there is compatibility between the encoding schemes), getting information as to where to move data (i.e., the application program may change the source or target areas for each insert and fetch statement), and moving the data from the database to the application program or vice-versa. Thus, row by row inserts and fetches are expensive using existing parameter binding techniques because the DBMS cannot ensure that the application programs have not changed the data portion of their API from SQL statement to SQL statement, and, therefore, must determine information, such as data type, length, and encoding, during processing of each SQL statement. The term "parameter binding" refers to a process of validating, converting, and moving data either to or from application program input or output parameters. Also, the terms "bind-in" or "bind-out" refer to the process of checking the validity of a parameter or of host variables. The validity check includes determining whether the data types are compatible, performing length checking, performing conversions (of data type or encoding), verifying valid data (e.g., decimal data), and scanning for NUL terminators. A NUL terminator may be a single character that denotes the end of a string.

By inserting and fetching multiple rows of data at a time, the database can decrease the execution cost of the SQL statement. For example, the application program may not change the definitions of the parameters for a multiple row insert statement because the database does not return control to the application program until multiple rows are inserted or fetched. In conventional systems, row binding is performed for inserting and fetching multiple rows of data, which is inefficient. That is, each row of data is processed separately. So even though the data types likely have not changed, the DBMS has to assume the data types may be changing as that row is processed (e.g., from integer, to decimal, to character), which leads to inefficiencies in processing.

The DB2® for OS/390® V7 system reduced processing costs by providing multiple paths on second fetches for local and distributed application programs. In particular, different modules processed local and distributed application programs. Also, some more efficient modules processed requests from application programs that provide host variable definitions that match those of the database definitions for tables being processed (i.e., application programs not requiring conversions), while other (possibly less efficient) modules processed requests from application programs that required conversions (e.g., of data types). On each fetch, the module initially assigned to processing the request would determine whether the application program sending the request requires any conversions. If the module initially assigned to processing the request only processes requests from application programs that do not require conversions, and the request does require conversions, or vice versa, then the request may have to be processed by a different module, which again leads to inefficiencies. Thus, for fetch processing, the cost may be more expensive, as the user descriptor area may have changed and needs to be checked. On the other hand, when a user descriptor area is unchanged, the faster modules that would not perform data type and more extensive data validity checks could process a request on second fetches. However, this approach is for certain special case scenarios.

Therefore, there is a need in the art for an improved technique for processing row inserts and fetches.

SUMMARY OF THE INVENTION

Provided are a method, system, and program for input parameter binding. When executing a statement, data in an application structure of the statement is compared with optimization information in a bind-in structure. When there is a match between the data in the application structure and data in the optimization information in the bind-in structure, the statement is executed with the optimization information.

Also provided are a method, system, and program for output parameter binding. When executing a statement, data in an application structure of the statement is compared with optimization information in a bind-out structure. When there is a match between the data in the application structure and data in the optimization information in the bind-out structure, the statement is executed with the optimization information.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention allow reuse of bind-in and bind-out optimization information that is stored during bind time. Herein, the term "bind time" refers to precompiling and compiling that occurs prior to execution of an application program. Additionally, implementations of the invention allow for improved transfer of data between client and server computers in local and distributed systems. A local system is one in which a client application resides at a server computer, while a distributed system is one in which the client application resides at a client computer.

Implementations of the invention may be used for input parameter binding as well as output parameter binding. In certain implementations of the invention, input parameter binding and/or output parameter binding can occur for any type of SQL statement (e.g., insert, fetch, update, delete, open, call, set, etc.). Although examples herein may refer to insert statements or fetch statements, the examples are intended merely to enhance understanding of various implementations of the invention and are not meant to limit implementations of the invention to insert and fetch statements. Also, in certain implementations, input parameter binding refers to binding host variables in an input host variable array, and output parameter binding refers to binding host variables in an output host variable array. Furthermore, implementations of the invention may be applied for column-array processing as well as stream-array processing. Column array processing refers to local processing, while stream array processing refers to distributed processing.

Figure 1:
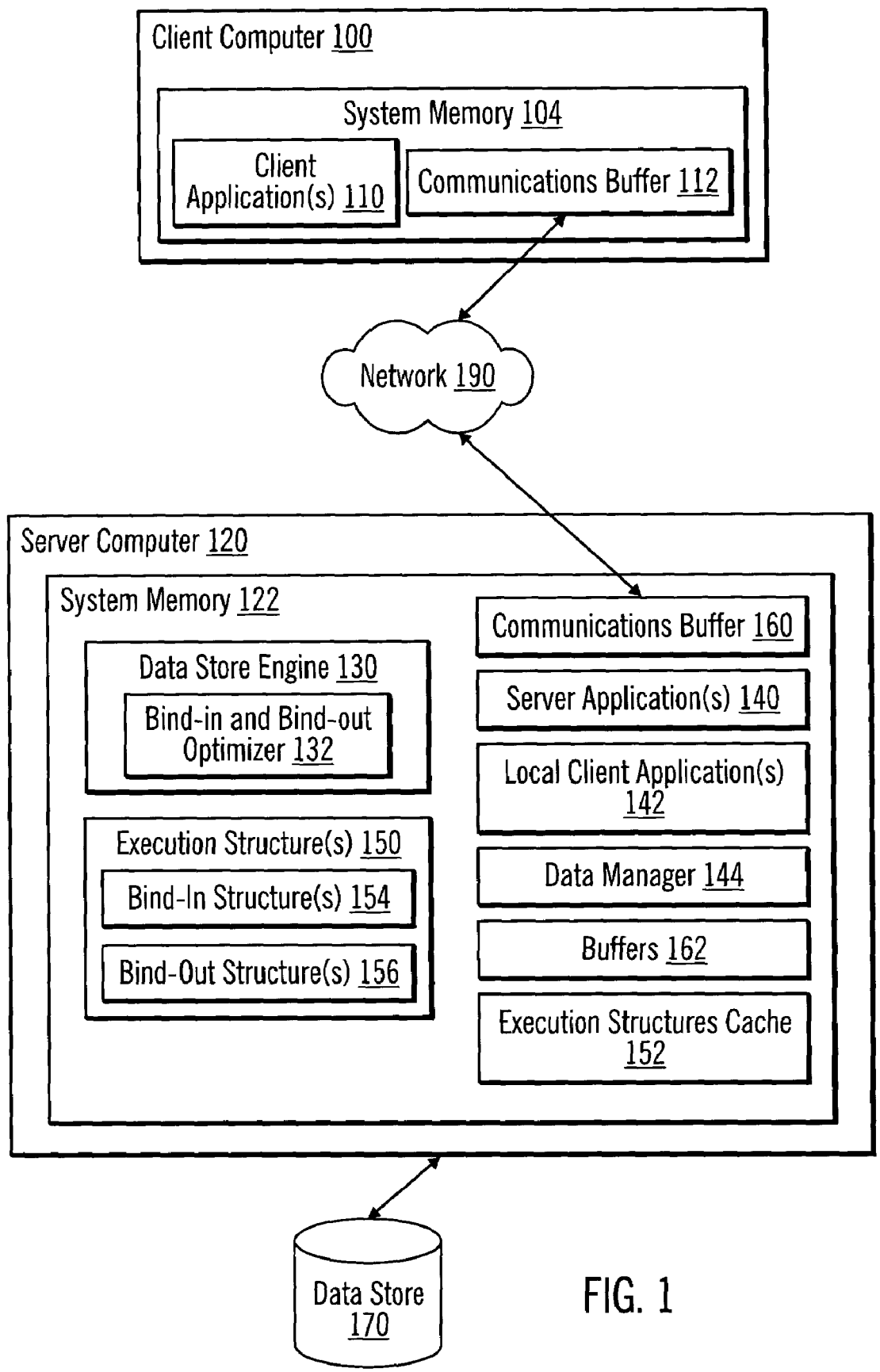
FIG. 1 illustrates, in a block diagram, a computing environment in accordance with certain implementations of the invention.

FIG. 1 illustrates, in a block diagram, a computing environment in accordance with certain implementations of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The client computer 100 includes system memory 104, which may be implemented in volatile and/or non-volatile devices. One or more client applications 110 may execute in the system memory 104. System memory 104 also includes a communications buffer 112.

The server computer 120 includes system memory 122, which may be implemented in volatile and/or non-volatile devices. A data store engine 130 executes in the system memory 122. A bind-in and bind-out optimizer 132 executes as part of the data store engine 130. One or more server applications 140, one or more local client applications 142, and a data manager 144 also execute in system memory 122. Local client applications 142 executing on the server computer 120 may also be referred to as "local applications" or "local client application programs".

System memory 122 may store one or more execution structures 150, and each execution structure 150 represents the operations of a statement (i.e., processing that is to occur for the statement). The execution structures 150 include zero or more bind-in structures 154 and zero or more bind-out structures 156. At bind time, for each statement, a bind-in structure 154 and/or bind-out structure 156 may be created. The bind-in structure 154 is created for input parameter binding (e.g., input host variable processing), and the bind-out structure 156 structure is created for output parameter binding (e.g., output host variable processing). The bind-in and bind-out optimizer 132 stores optimization information into the created structures 154 and/or 156 during bind time that may be used during execution of an application program.

Other structures (not shown) may also be generated and stored in system memory 122 and/or data store 170. The system memory 122 may also include an execution structures cache 152. In certain implementations, the execution structures cache 152 is read-only. Also, buffers 162 (e.g., internal buffers for local processing and intermediate buffers for distributed processing) are included in system memory 122.

In certain implementations of the invention, the optimization information stored may include, for example, data type, length, Coded Character Set Identifier (CCSID), and array size (e.g., for a host variable array). A Character Data Representation Architecture (CDRA) deals with the differences in string representation and encoding. The CCSID is an element of this architecture. The CCSID is a two byte (unsigned) binary number that uniquely identifies an encoding scheme and one or more pairs of character sets and code pages. A CCSID is an attribute of strings, similar to length is an attribute of strings. All values of the same string column have the same CCSID. In certain implementations of the invention, the bind-in and bind-out optimizer 132 may also store information as to whether conversions are required and whether these are valid conversions.

The server computer 120 provides the client computer 100 with access to data in a data store 170. The data store 170 may comprise an array of storage devices, such as Direct Access Storage Devices (DASDs), Just a Bunch of Disks (JBOD), Redundant Array of Independent Disks (RAID), virtualization device, etc.

For distributed processing, a client application 110 may submit an insert or fetch statement communication with client code (e.g., a JAVA® Database Connectivity (JDBC) client, an Open DataBase Connectivity (ODBC) client, or a DB2® Connect client) to the server computer 120. In this case, the data store engine 130 sees a Distributed Relation Database Architecture (DRDA) flow.

For local processing, a local client application 142 may submit an insert or fetch statement identifying an application structure to the server computer 120. The application structure may be used to store data retrieved by the data store engine 130 for a fetch statement or may be used to provide data to the data store engine 130 for an insert statement. The bind-in and bind-out optimizer 132 may store optimization information for the application structure into the bind-in and/or bind-out structure 154, 156. For certain statements (e.g., multiple row insert, multiple row fetch, or single row fetch statements), the data store engine 130 may be able to use the optimization information to execute the insert or fetch statement. If the optimization information may be used, the data store engine 130 more efficiently processes the insert or fetch statement.

Figure 2:
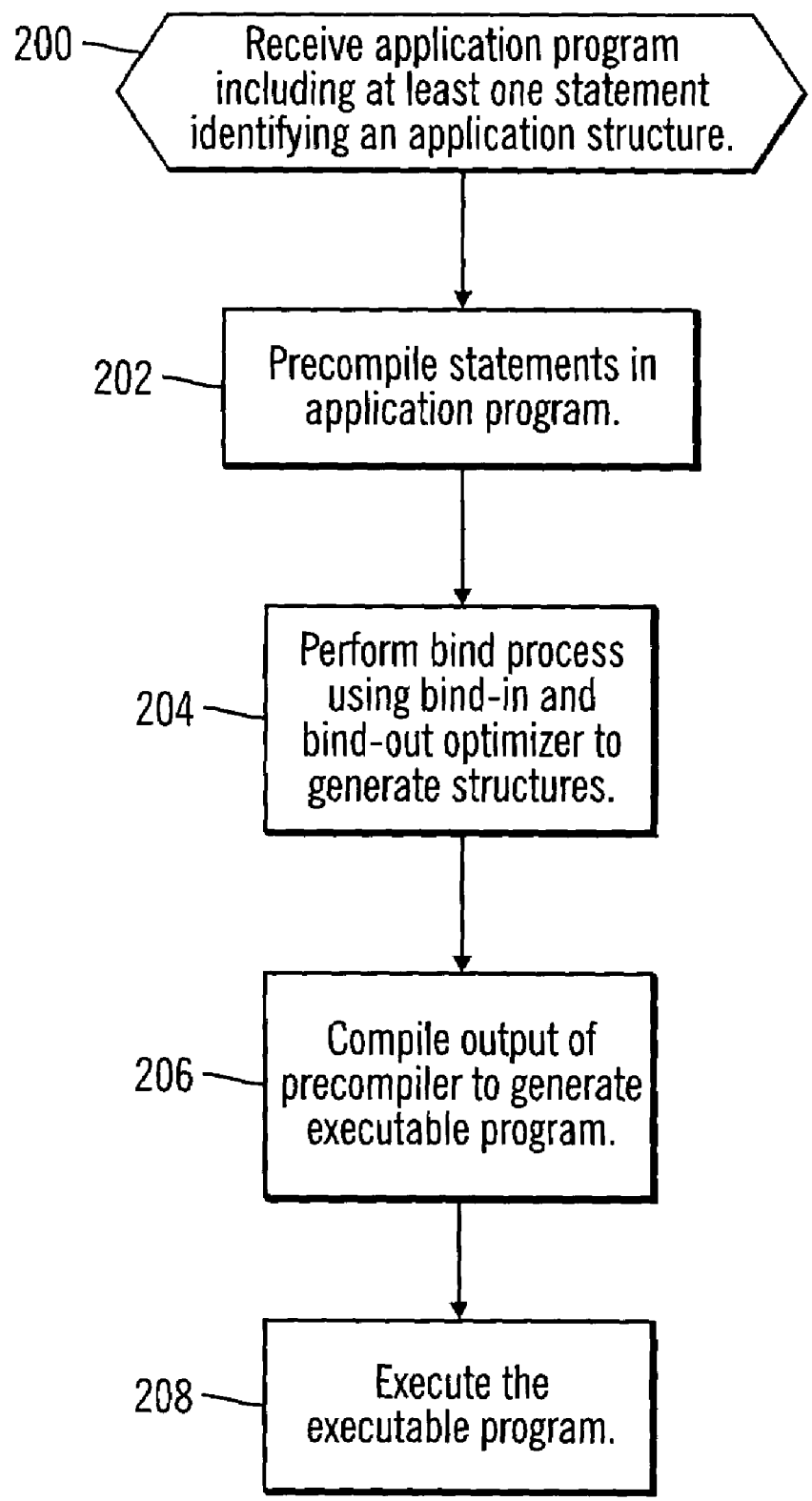
FIG. 2 illustrates logic performed by the data store engine in accordance with certain implementations of the invention.

FIG. 2 illustrates logic performed by the data store engine 130 in accordance with certain implementations of the invention. Control begins at block 200 with receipt of an application program containing one or more statements, and at least one statement identifies an application structure (e.g., for a multiple row insert statement, a multiple row fetch statement, or a single row fetch statement). The application structure describes data and may be in any format. For example, the application structure may be in an SQLDA format 0, format 1, or Distributed Relation Database Architecture (DRDA) data description. DRDA refers to an architecture in which data is streamed. Any type of application structure may be used with the bind-in and bind-out optimizer. In FIG. 1, data may be streamed via the network 190.

In block 202, the data store engine 130 precompiles the application program. Precompiling refers to processing statements (e.g., SQL statements) in the application program before the statements are compiled. The output from a precompile process includes source code that may be submitted to a compiler and that may be used in the bind process. For example, the precompiling may process some of the data in the application structure (e.g., SQLDA). Each statement is also placed into a DataBase Request Module (DBRM) as part of the precompilation process. A DBRM contains information about SQL statements and is used in the bind process. Section numbers refer to sections of a plan or package, and, the precompiler defines section numbers as a statement is being precompiled. The section numbers are stored in the DBRM. In certain implementations, a section number is associated with each statement. If there are bind-in and/or bind-out structures 154, 156 for the statement, then these are associated with the same section number.

In block 204, the bind-in and bind-out optimizer 132 assists in the bind process. The DBRM is input to the bind process, and the output of the bind process includes one or more structures (e.g., execution 150, bind-in 154, and/or bind-out 156 structures). In particular, during the bind process, the DBRMs from the precompiler are bound in a collection, and the collection is bound in a package (e.g., an access plan or an application plan). That is, during the bind process, access paths to the data are selected, along with some other processing (e.g., authorization checking). Execution structures for use in executing a SQL statement are generated and stored in a persistent data store (e.g., data store 170). In certain implementations, an execution structure, along with a bind-in structure and/or a bind-out structure, may be generated for each statement (e.g., a fetch statement, an insert statement, etc.).

Additionally, in block 204, the bind-in and bind-out optimizer generates optimization information that is stored in bind-in structures 154 and/or bind-out structures 156.

The bind-in and bind-out optimizer 132 also generates branch tags and stores these into the execution structure 150. That is, during the bind process, an execution path (via branch tags) is stored in the bind-in and bind-out structures 154, 156. Execution costs for subsequent statements may be reduced since the information of which part of the code to execute (i.e., via the branch tags) may be retrieved from the bind-in and/or bind-out structures 154, 156 and, in certain cases, reused. In certain cases, at first use, the execution path may need to be reoptimized if the bind-in and bind-out optimizer 132 detects that the application program data does not match the optimized information.

In block 206, the output from the precompile process is run through a compiler, and the output of this is an executable program.

In block 208, the executable program is executed, a connection to the data store engine 130 is made, and the execution structures for a particular statement are loaded into system memory 122 as needed by the data store engine 130. When host variable processing (input or output host variable processing) occurs, the bind-in and bind-out optimizer 132 assists in the processing.

For certain applications, such as JAVA® using JAVA® Database Connectivity (JDBC), there is no precompiler phase. Instead, there is a dynamic prepare phase, which is similar to the bind process, followed by execution of the statement.

Figure 3A:
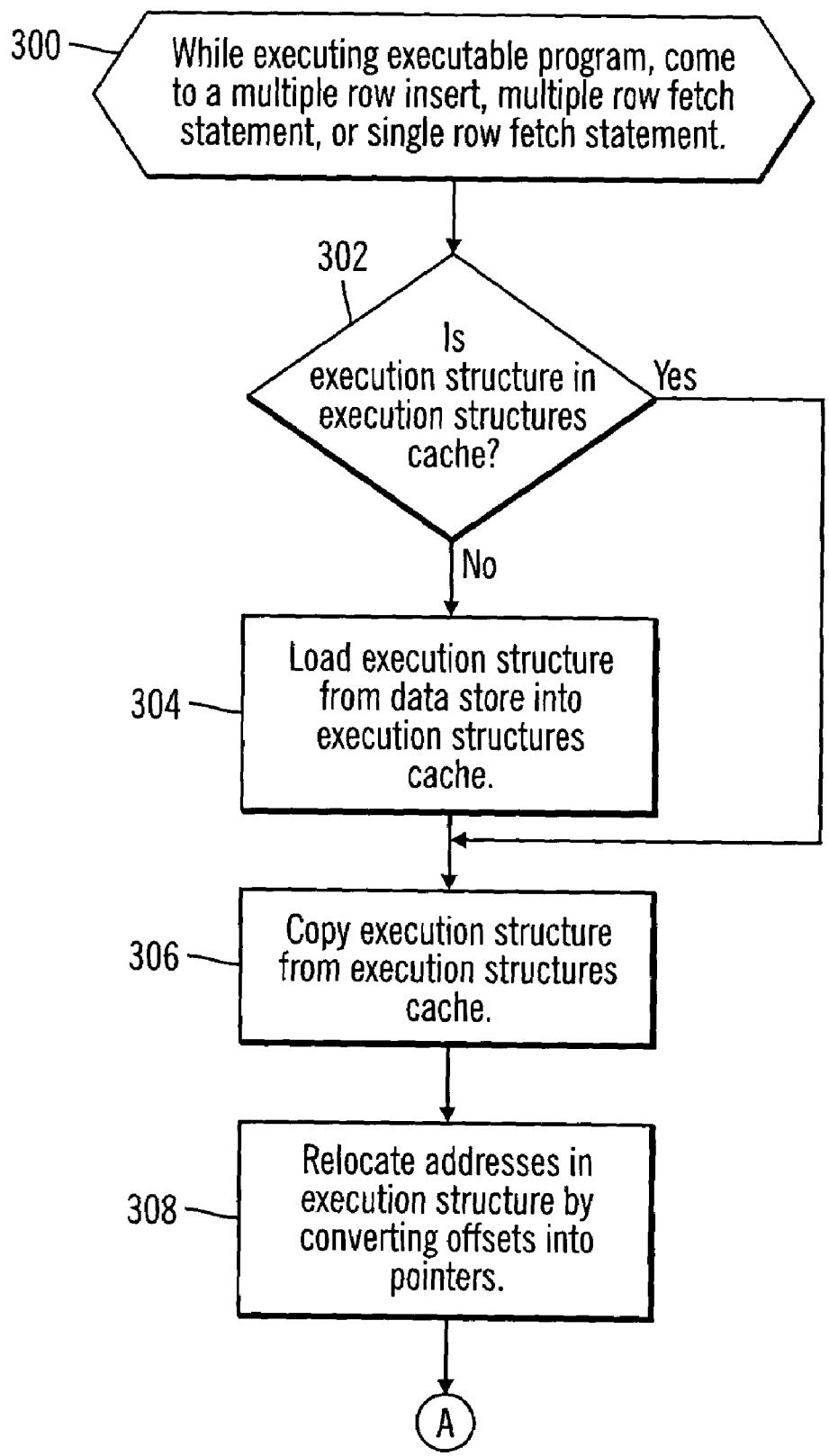
FIGS. 3A and 3B illustrate logic performed by the data store engine and the bind-in and bind-out optimizer in accordance with certain implementations of the invention.
Figure 3B:
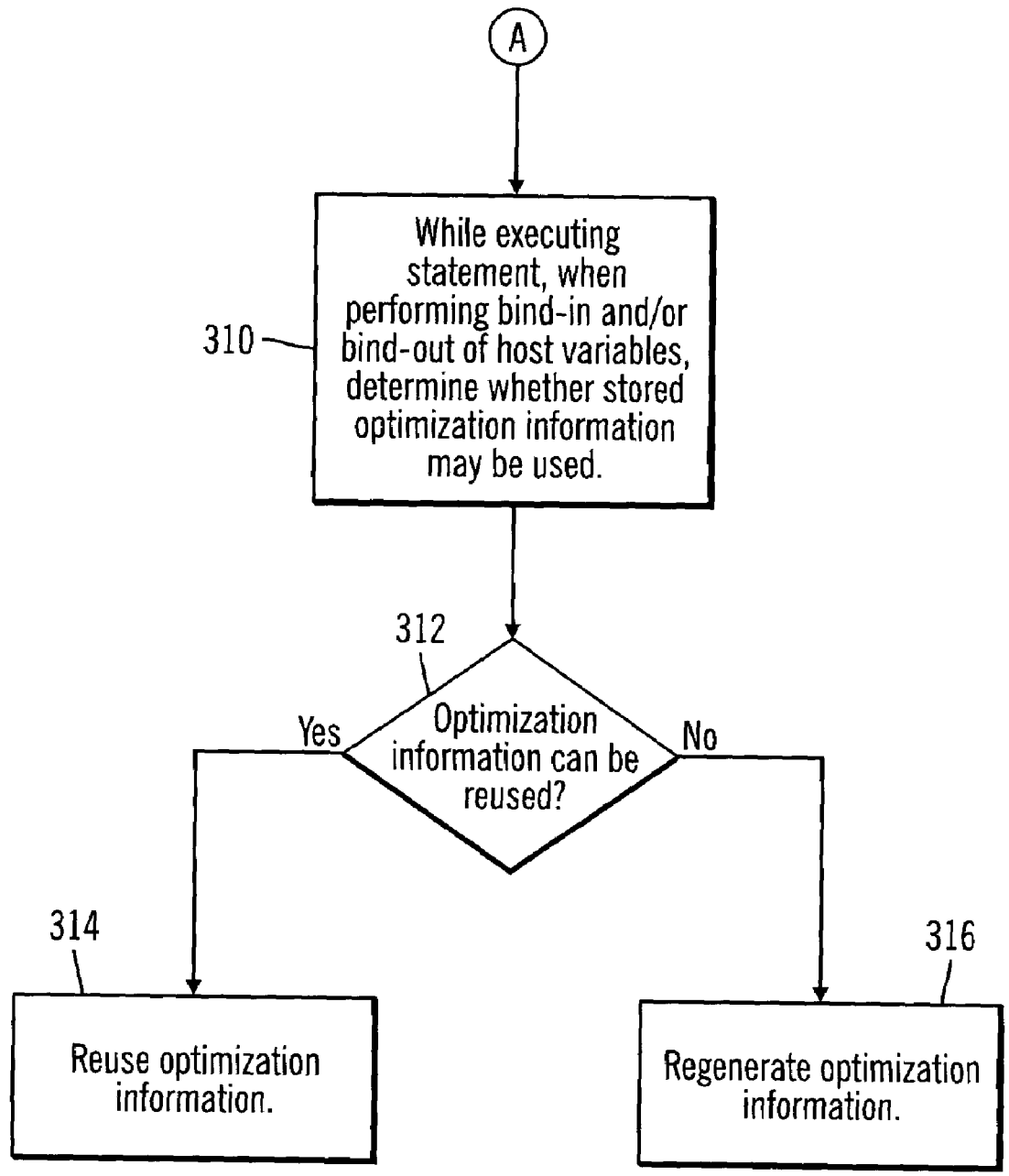

FIGS. 3A and 3B illustrate logic performed by the data store engine 130 and the bind-in and bind-out optimizer 132 in accordance with certain implementations of the invention. Control begins at block 300 and a statement (e.g., a multiple row insert, a multiple row fetch, or a single row fetch statement) is reached in the executable program.

In block 302, the data store engine 130 determines whether an execution structure for this statement exists in the execution structures cache 152. The determination may be made by matching a section number associated with the statement with the same section number associated with an execution structure in the execution structures cache 152. If an execution structure does not exist in the execution structures cache 152 for this statement, then processing continues to block 304, otherwise, processing continues to block 306, skipping the processing in block 304.

In block 304, the data store engine 130 loads the execution structure from the data store 170 into the execution structures cache 152. In block 306, the data store engine 130 generates a copy of the execution structure from the execution structures cache, and this copy is used for further processing. That is, this copy of the execution structure may be modified, which leaves the unmodified copy of the execution structure in the execution structures cache 152 available for later retrieval and use.

In block 308, the data store engine 130 relocates addresses (e.g., branch tags) in the execution structure by converting offsets into pointers. In block 310, while executing the statement, when performing bind-in and/or bind-out of host variables, the bind-in and bind-out optimizer 132 determines whether stored optimization information in the bind-in structure 154 and/or bind-out structure 156 may be used. In block 312, if the optimization information can be reused, processing continues to block 314, otherwise, processing goes to block 316. In block 314, the optimization information is reused. In block 316, the optimization information is regenerated and stored in the bind-in and/or bind-out structures 154, 156.

If the optimization information may be used, then some of the costs of executing the statement may be avoided (e.g., determining the type of data present in the data store and in the application program, determining whether data is to be converted from one encoding scheme into another encoding scheme or from one data type to another data type, checking whether data conversion is valid, getting information as to where to move data, and moving the data from the database to the application program or vice-versa).

If the optimization information stored in the bind-in and/or bind-out structures 152, 154, may be reused, the data store engine 130 does not need to look at how the application program is providing data (for insert) or how the application program wants data returned (for fetch). For example, if an application program fetched data from a table that contained integers, and the application program requested that the data be fetched into an array (e.g., a host-variable-array) of integers, then the bind-out logic of the bind-in and bind-out optimizer 132 would determine that the optimization information that was stored in the bind-out structure 156 at bind time could be used. If the application program fetched the data from the table containing integers into an array of small-integers, then the bind-out logic of the bind-in and bind-out optimizer 132 would determine that the bind time information could not be used, and the bind-in and bind-out optimizer 132 would recalculate the optimization information (e.g., data type, length, CCSID, array size, whether conversions are required, whether conversions are valid, and/or branch tags).

If optimization information is to be regenerated, the optimization information may be regenerated during processing of an initial row, so that the optimization information may be reused for subsequent rows.

Figure 4:
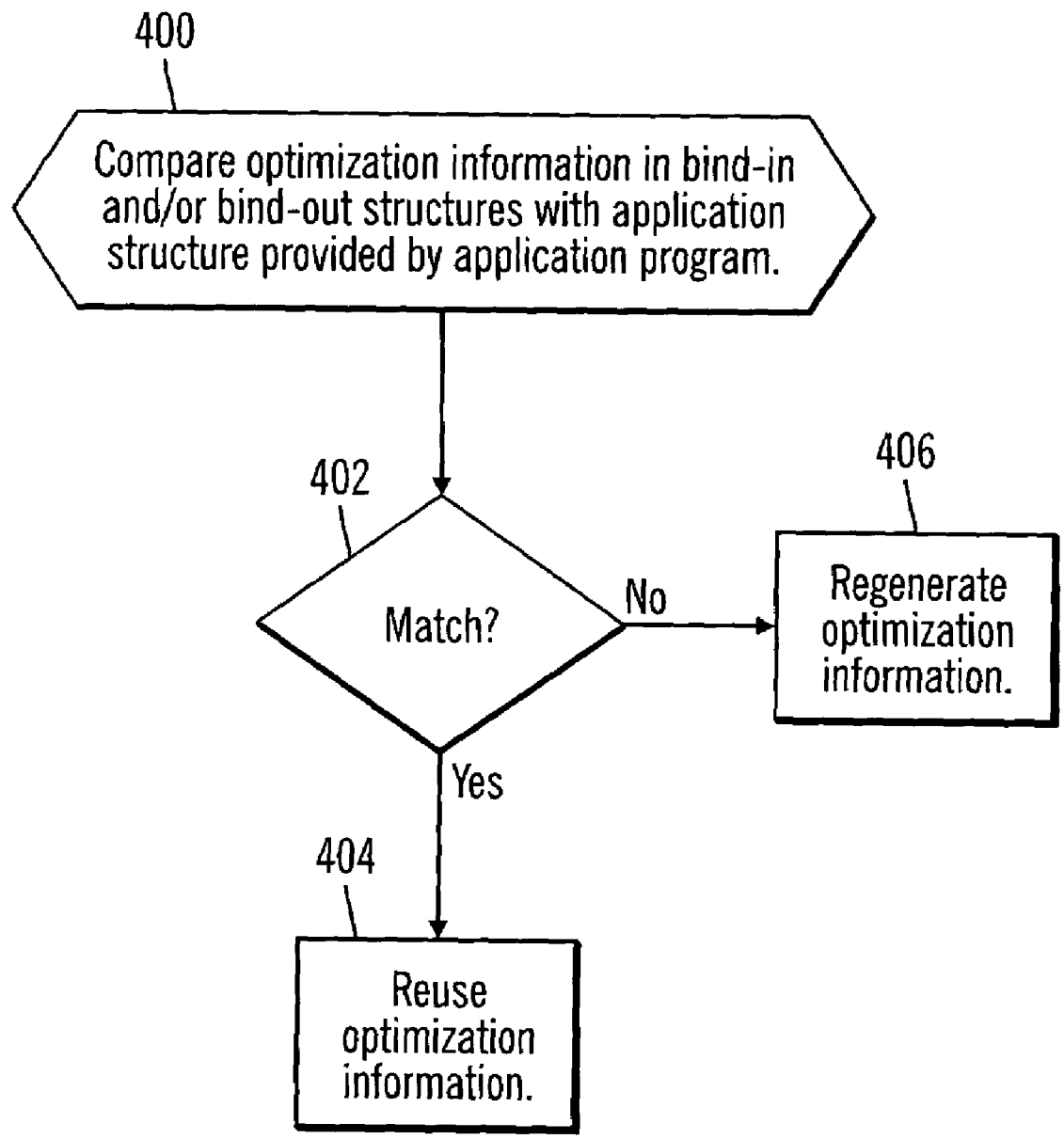
FIG. 4 illustrates logic implemented in the bind-in and bind-out optimizer to determine whether optimization information may be reused.

FIG. 4 illustrates logic implemented in the bind-in and bind-out optimizer 132 to determine whether optimization information may be reused. Control begins at block 400 with the bind-in and bind-out optimizer 132 comparing optimization information in the bind-in and/or bind-out structure 154, 156 with the application structure identified by the statement (e.g., a multiple row insert statement, a multiple row fetch statement or a single row fetch statement). There is a section number associated with each statement. If there are bind-in and/or bind-out structures 154, 156 for the statement, then these are associated with the same section number. Therefore, the bind-in and/or bind-out structures 154, 156 used for comparison are ones that are associated with the section number that is associated with the statement.

In block 402, the bind-in and bind-out optimizer 132 determines whether there is a match. In certain implementations of the invention, a match occurs if the bind-in and bind-out optimizer 132 determines that the data in the application structure matches the optimization information (e.g., data type, length, CCSID, array size, whether conversions are required, whether conversions are valid, and/or branch tags). In other implementations of the invention fewer or more or other characteristics may be used to determine whether there is a match. For local applications, the match is determined by comparing the optimization information against the data in the application structure. For distributed applications, the match is determined by comparing the optimization information against information in the DRDA flow, which includes metadata that is sent with the data.

Also, in block 402, if the optimization information matches the application structure, then processing continues to block 404, otherwise, processing continues to block 406. In block 404, the optimization information is reused. In block 406, the optimization information is regenerated and stored in the bind-in and/or bind-out structures 154, 156.

Implementations of the invention may be applied for column-array processing as well as stream-array processing. In certain implementations, column array processing refers to local processing, while stream array processing refers to distributed processing.

Figure 5:
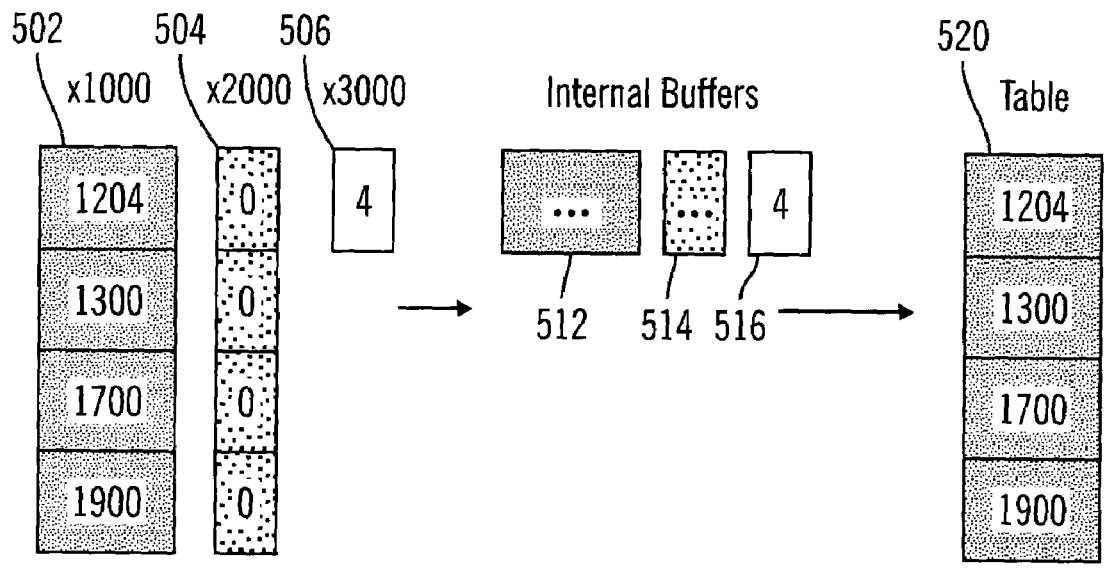
FIG. 5 illustrates local processing for a multiple row insert statement in accordance with certain implementations of the invention.

FIG. 5 illustrates local processing for a multiple row insert statement in accordance with certain implementations of the invention. A local client application 142 is inserting data into table 520. In an insert statement, the local client application 142 provides a column of data in a host variable array 502 that starts at memory location x1000. In this illustration, host variable array 502 references integer data. The local client application 142 also provides a column of data in an indicator array 504 that starts at memory location x2000 and represents an array of indicator variables. An indicator array is an array of indicator variables, and an indicator variable is used to either indicate the data being provided by the application program (e.g., as input) to the data store engine 130 is NULL or the data being returned from the data store engine 130 to the application program (e.g., as output) is NULL. That is, indicator variables are used to indicate that there is no data for a particular column or a particular instance (row) of data. The local client application 142 provides a value N that starts at memory location x3000 and represents the number of values in the host variable array (i.e., 4 for this illustration). At runtime, the value for N is located and moved into an internal buffer 516 in the data store engine 130 address space. Then, one set of values for the host variable array 502 and the indicator array 504 (e.g., 1204, 0) are moved into internal buffers 512 and 514, respectively. Next, the data store engine 130 calls a data manager 144 to insert the data from the internal buffers 512, 514 into the table 520. Then, the next set of values for the host variable array 502 and the indicator array 504 (e.g., 1300, 0) are moved into internal buffers 512 and 514, respectively, and the data store engine 130 calls the data manager 144 to insert the data from the internal buffers 512, 514 into the table 520. This continues until the four rows of data in the host variable array 502 are inserted into table 520.

Figure 6:
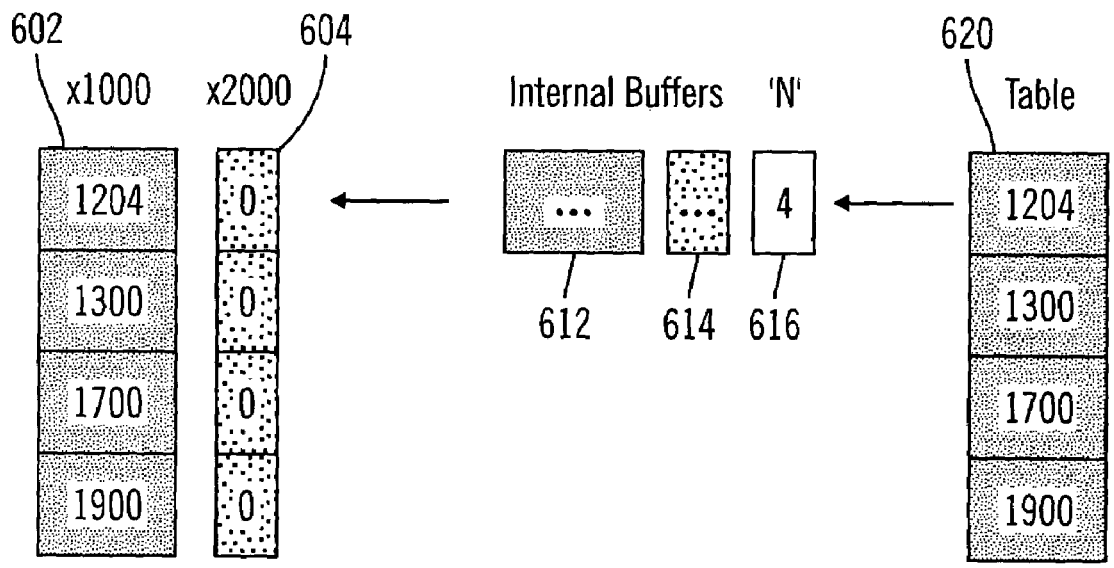
FIG. 6 illustrates local processing for a multiple row fetch statement in accordance with certain implementations of the invention.

FIG. 6 illustrates local processing for a multiple row fetch statement in accordance with certain implementations of the invention. A local client application 142 is fetching data from table 620 into host variable array 602. In a fetch statement, the local client application 142 provides the host variable array 602 that starts at memory location x7000. The local client application 142 also provides a column of data in an indicator array 604 that starts at memory location x8000 and represents an array of indicator variables. The data store engine 130 calls the data manager 144 to move a row of data from table 620 into internal buffers 612, 614. The data store engine 130 then moves the data from internal buffers 612, 614 into the host variable array 602 and indicator array 604, respectively, for access by the local client application 142. Note that the value of N is stored in internal buffer 616. Each row of table 620 is processed in this manner.

For distributed fetch processing, row-stream processing is performed so that row after row of data is sent across network 190, and, for insert, column binding is performed so that data is put on the network 190 column after column. For column binding, a different structure (e.g., host variable array) is bound to each parameter.

Figure 7:
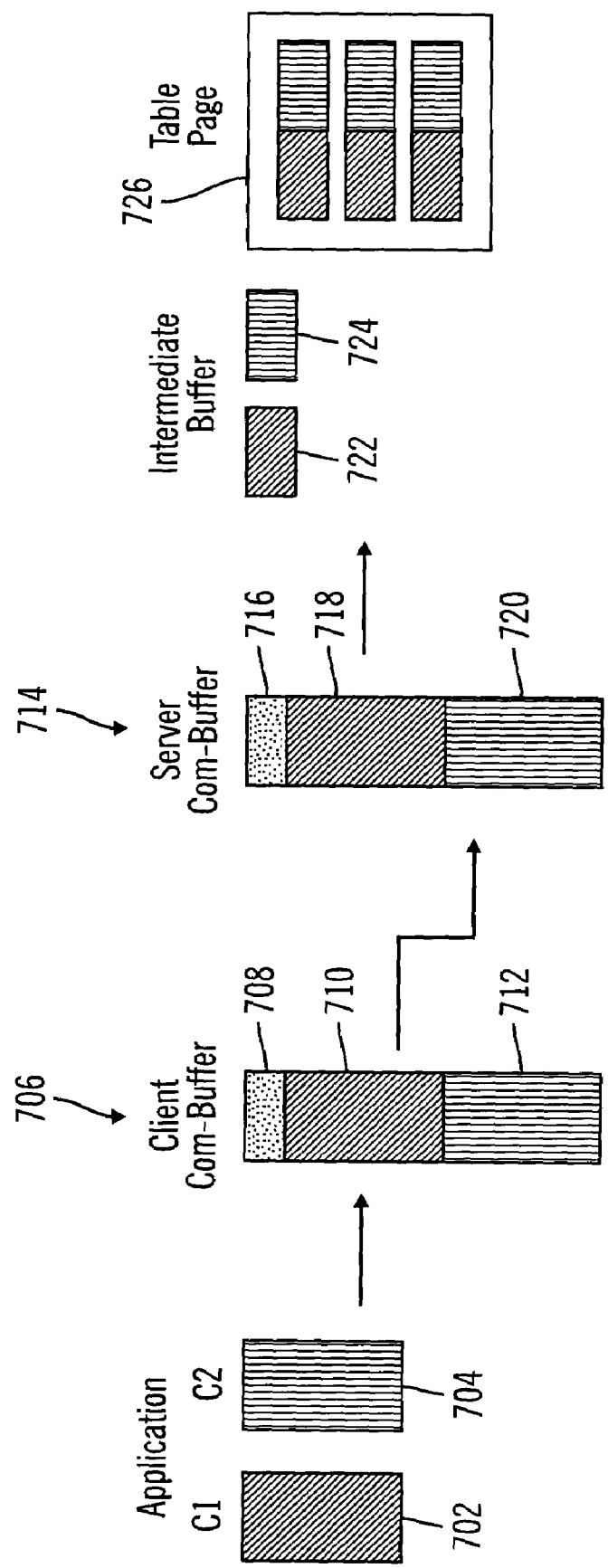
FIG. 7 illustrates distributed processing for a multiple row insert statement in accordance with certain implementations of the invention.

FIG. 7 illustrates distributed processing for a multiple row insert statement in accordance with certain implementations of the invention. For distributed processing, for an insert statement, data is blocked up at the client computer 100 and moved to the server computer 120. A client application 110 wants to insert column C1 702 and column C2 704 into table 726. Data is moved from column C1 702 and then column C2 704 into client communications buffer 706 on behalf of the client application 110 (e.g., by DB2® Connect or by a JDBC type 4 client). In certain implementations, the value for N flows as part of the statement metadata 708 in the client communications buffer 706. In certain alternative implementations, the value for N flows with the data, rather than as part of the statement metadata 708. Also, in FIG. 7, the data for column C1 is 710 and the data for column C2 is 712. The data in the client communications buffer 706 is moved into the server communications buffer 714 over network 190 as one piece. In certain implementations, the value for N flows as part of the statement metadata 716 in the server communications buffer 714. In certain alternative implementations, the value for N flows with the data, rather than as part of the statement metadata 716. In the server communications buffer 714, the data for column C1 is 718 and the data for column C2 is 720. The data store engine 130 moves a row of data from the server communications buffer 714 into the intermediate buffers 722, 724. The data store engine 130 calls the data manager 144 to insert the data from intermediate buffers 722, 724 into the table 726. In this manner, each row of data is moved from the server communications buffer 714 into the intermediate buffers 722, 724, and then into the table 726.

For distributed processing, the data store engine 130 identifies a location (e.g., an address) into which data is to be moved before the data is actually moved. That is, local and distributed processing are both optimized with regards to branch tag processing, however, with distributed processing, only the actual data may be sent, so the location of the next data item is calculated on the fly and placed in a stream of data. For example, if a string of length 100, with the value "ABC", is defined, the string contains "ABC" and 97 pad characters. If a varying length string of length 100 is defined, and the string contains "ABC", then the string simply contains "ABC" and that is all that is in the flow. That is, for the fixed length string, 100 characters would be part of the flow, but the varying length string would have a length followed by the actual data. This is the reason that the buffer addresses of the data have to be determined on the fly. For local processing, data is retrieved or placed into a structure (e.g., a host variable array), and so the location of the next data item can be pre-calculated. Also, for fixed length data, even in the case of distributed processing, the pre-calculated length may be used. For example, an integer takes four bytes in a column array or a stream. With implementations of the invention, column (e.g., local processing) and stream (e.g., Distributed Relation Database Architecture (DRDA) processing) processing may use the bind-in and bind-out optimizer 132 to determine whether stored optimization information may be reused.

For distributed processing, a location of data is regenerated or calculated on the fly. For example, for a multi-row insert (FIG. 7), as data is retrieved from the application program address space, the location of the data in the application program address space is regenerated or calculated on the fly. Also, the location of where the retrieved data is to be written in the client communications buffer 706 is regenerated or calculated on the fly.

Figure 8:
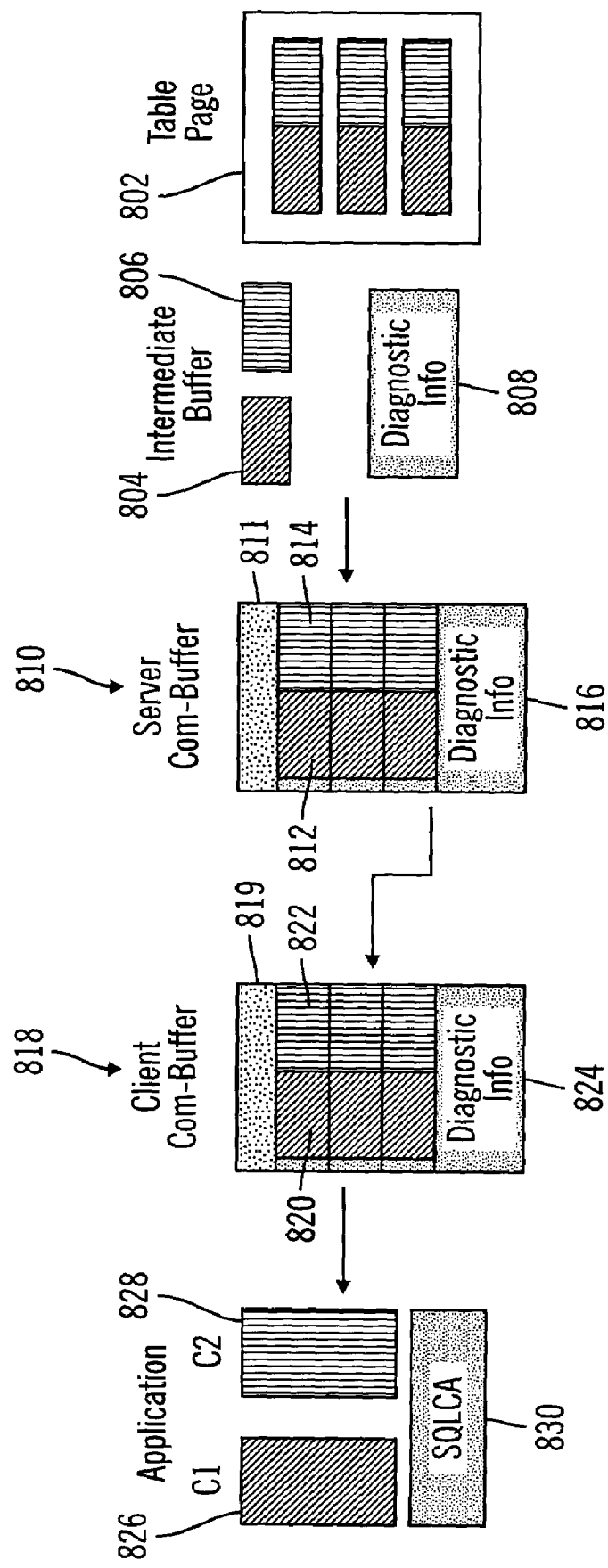
FIG. 8 illustrates distributed processing for a multiple row fetch statement in accordance with certain implementations of the invention.
Figure 9:
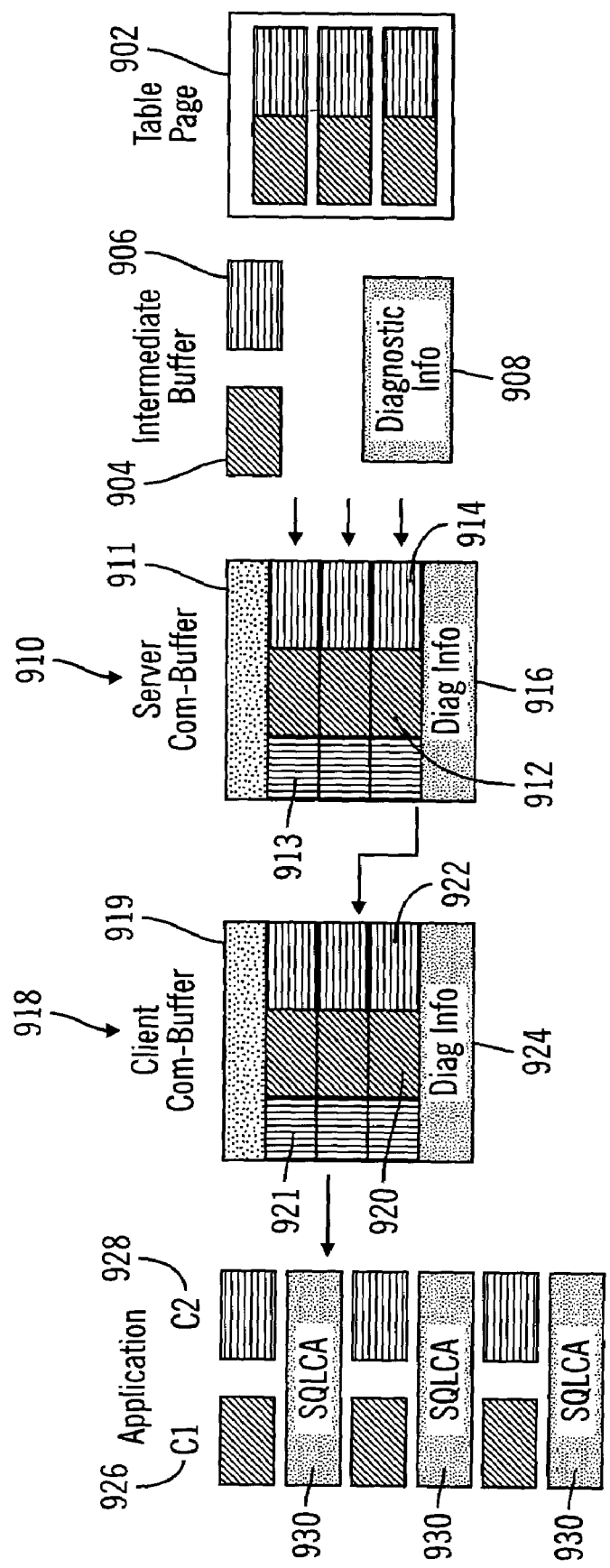
FIG. 9 illustrates distributed processing for a limited block fetch statement in accordance with certain implementations of the invention.

In FIG. 7, the communications buffers 706, 714 store columns of data, while in FIGS. 8 and 9, the communications buffers 818, 810, 910, 918 store rows of data. Thus, in FIG. 7, a value is retrieved for column C1 702, then the next value is retrieved for column C1 702, etc., until the values of column C1 702 have been retrieved from the application program address space and inserted into the client communications buffer 706. Then, the values in column C2 704 are processed one at a time. The location of data in the application program address space changes by a fixed amount, while the location of data in the client communications buffer 706 may change by a varying amount.

The metadata 716 includes the offsets of where data begins for column C1 718 and column C2 720 in the server communications buffer 714. As data is read from the server communications buffer 714, the location of data is regenerated or calculated on the fly and may change by a varying amount. In particular, a value for column C1 718 is read and inserted into intermediate buffer 722, a value for column C2 720 is read and inserted into intermediate buffer 724, and the values from the intermediate buffers 722, 724 are inserted into table 726. This processing continues until the values in columns C1 and C2 718, 722 are inserted into intermediate buffers 722, 724 and then inserted into table 726. The intermediate buffers 722, 724 are fixed, and so the location of data in the intermediate buffers 722, 724 does not change.

FIG. 8 illustrates distributed processing for a multiple row fetch statement in accordance with certain implementations of the invention. Data is moved into the server communications buffer 810 one value at a time from table 802, but data is not moved to the client application 110 one value at a time. In particular, data for columns C1 and C2 is moved by data manager 144 from table 802 into intermediate buffers 804, 806 one value at a time, and diagnostic information is stored in buffer 808.

In particular, a value is moved from table 802 to buffer 804, then a value is moved from table 802 to buffer 806. Then the value in buffer 804 and the value in buffer 806 are moved to the server communications buffer 810 by the data store engine 130. This sequence of data movement continues until the values in the table 802 are moved, via the buffers 804, 806 into the server communications buffer 810. Additionally, diagnostic information is gathered as the data is returned. When the data processing is completed (all the user data is in the server communications buffer 810), the diagnostic information is appended to the end of the server communications buffer 810, and the metadata, user data, and diagnostic data all flow back to the client communications buffer 818 as one network flow.

In the server communications buffer 810, metadata is 811, data for column C1 is 812, data for column C2 is 814, and diagnostic information is 816. The data in the server communications buffer 810 is moved into the client communications buffer 818 over network 190, as one piece. In the client communications buffer 818, metadata is 819, data for column C1 is 820, data for column C2 is 822, and diagnostic information is 824. At the client computer 100, the data from the client communications buffer 818 is returned to the client application 110 in column-array format, so that client application 110 may access column C1 826 and column C2 828, as well as the SQL communication area (SQLCA) 830, which contains diagnostic information. The metadata 811 in the communications buffers 810, 818 includes control information. The SQLCA includes a set of variables that provide an application program with information about the execution of its SQL statements or its requests from the data store engine 130 and/or data manager 144.

In FIG. 8, at the server computer 120, when fetching data, the location of data is regenerated or calculated on the fly when putting data from the intermediate buffers into the server communications buffer 810. The location of data in the intermediate buffers 804, 806 is fixed.

At the client computer 100, the location of data is regenerated or calculated on the fly while reading data from the client communications buffer 818 and while writing data into the application program address space. The location of data in the application program address space changes by a fixed amount, while the location of data in the client communications buffer 818 may change by a varying amount.

FIG. 9 illustrates distributed processing for a limited block fetch statement in accordance with certain implementations of the invention. FIG. 9 is similar to FIG. 8, but in FIG. 9, the application program submits three explicit fetch statements to retrieve each row of data. Data is moved into the server communications buffer 910 one value at a time from table 902, but data is not moved to the client application 110 one value at a time. In particular, data for columns C1 and C2 is moved by data manager 144 from table 902 into intermediate buffers 904, 906 one value at a time, and diagnostic information is stored in buffer 908.

In FIG. 9, each row of data has row level diagnostic information (a SQLCARD 913), then the column data follows the row level diagnostic information. Complete diagnostic information is at the end of the stream, and this information is optional and sent upon client application 110 request. In this case, a value from buffer 904, then a value from buffer 906 are moved into the server communications buffer 910 by the data store engine 130. In particular, a value is moved from table 902 to buffer 904, then from table 902 to buffer 906. Then, the value in buffer 904, and the value in buffer 906 are moved to the server communications buffer 910 by the data store engine 130. This sequence of data movement continues until the values in the table 902 are moved, via the buffers 904, 906 into the server communications buffer 910. Additionally, diagnostic information is gathered as the data is returned. When the data processing is completed (all the user data is in the server communications buffer 910), the diagnostic information is appended to the end of the server communications buffer 910, and the metadata, user data, and diagnostic data all flow back to the client communications buffer 918 as one network flow.

In the server communications buffer 910, metadata is 911, data for column C1 is 912, data for column C2 is 914, and diagnostic information is 916. The data in the server communications buffer 910 is moved into the client communications buffer 918 over network 190, as one piece. In the client communications buffer 918, metadata is 919, data for column C1 is 920, data for column C2 is 922, and diagnostic information is 924. At the client computer 100, the data from the client communications buffer 918 is returned to the client application 110 in host variables. In particular, a row of data and an SQLCA is returned to the client application 110. For the illustrated example of FIG. 9, the client application 110 issues 3 fetch statements. In this illustration, the SQLCA structure 921 precedes each row of data sent to the client application 110, and the client application 110 may access column C1 926 and column C2 928, as well as the SQLCA 930, which contains diagnostic information. The metadata 911, 919 in the communications buffers 910, 918 includes control information.

During bind time (block 204) or if optimization information is regenerated (block 316), the bind-in and bind-out optimizer 132 stores an increment length by which a data pointer (that is pointing to data in an application program address space) is to be incremented to find a next row of data for local processing. That is, the location of the data in the application program address space for the next row is calculated at bind time, and, if necessary, when regenerating optimization information. At the client computer 100, for a fetch statement, the pointer would point to a location into which data is to be stored, while, for an insert statement, the pointer would point to the location from which data is to be retrieved. For example, in FIGS. 5 and 6, a pointer would initially point to x1000 in the application program address space, and the increment length would be the length by which the pointer is to be incremented to get to the next location of data in column C1. In certain implementations of the invention, the increment length is a maximum size for a varying length set of data. That is, in certain implementations, a maximum increment for a varying length set of data is used when dealing with column arrays. Column arrays (or host-variable-arrays) may be allocated to contain the maximum data, and, for fixed length values, this is simply the length, while for varying length strings, this is the maximum length of the string.

For both local processing and distributed processing, the value of the optimization information is pre-calculated at bind time. If the pre-calculated optimization information does not match the application information, then, the optimization information is regenerated during row processing.

In certain implementations of the invention, when a stored procedure passes a handle to a cursor to an application program, the optimization information may be recalculated. A stored procedure may be described as a user-written application program that may be started through the use of a SQL statement and that may return a handle to a cursor. The stored procedure may be invoked by a local application or by a distributed application. A cursor may be described as a named control structure that an application program uses to point to a single row or multiple rows within some ordered set of rows of a result table (e.g., a result set). A cursor may be used to retrieve, update, or delete rows from a result table. In certain implementations, if the caller of the stored procedure is a local application, the local application provides a SQLDA, and the bind-in and bind-out optimizer 132 is able to determine whether the optimization information needs to be recalculated. In certain implementations, if the caller of the stored procedure is a distributed application, a SQLDA is not provided, and optimization information is recalculated.

Thus, implementations of the invention process data for initial rows (i.e., a row referenced in an initial multiple row insert or multiple row fetch statement) to reduce processing costs for subsequent rows (i.e., rows references in subsequent multiple row insert or multiple row fetch statements). Implementations of the invention are applicable to multiple row inserts, multiple row fetches, and single row fetches.

Implementations of the invention also determine whether a request is from an application program that provides host variable definitions that match those of the data store definitions for tables being processed (i.e., application programs not requiring conversions). Since one component, the bind-in and bind-out optimizer 132 performs the processing, even if an application program does require conversions, the request is not passed to another module for processing. Instead, the bind-in and bind-out optimizer 132 regenerates optimization information, so that subsequent requests may use the optimization information.

DB2, OS/390, and z/OS are registered trademarks or common law marks of International Business Machines Corporation in the United States and/or other countries. JAVA is a registered trademark or common law mark of Sun Microsystems in the United States and/or other countries.

Additional Implementation Details

The described techniques for optimized parameter binding may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2, 3A, 3B, and 4 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2, 3A, 3B, and 4 may be implemented in software, hardware, programmable and non-programmable gate array logic or in some combination of hardware, software, or gate array logic.

Figure 10:
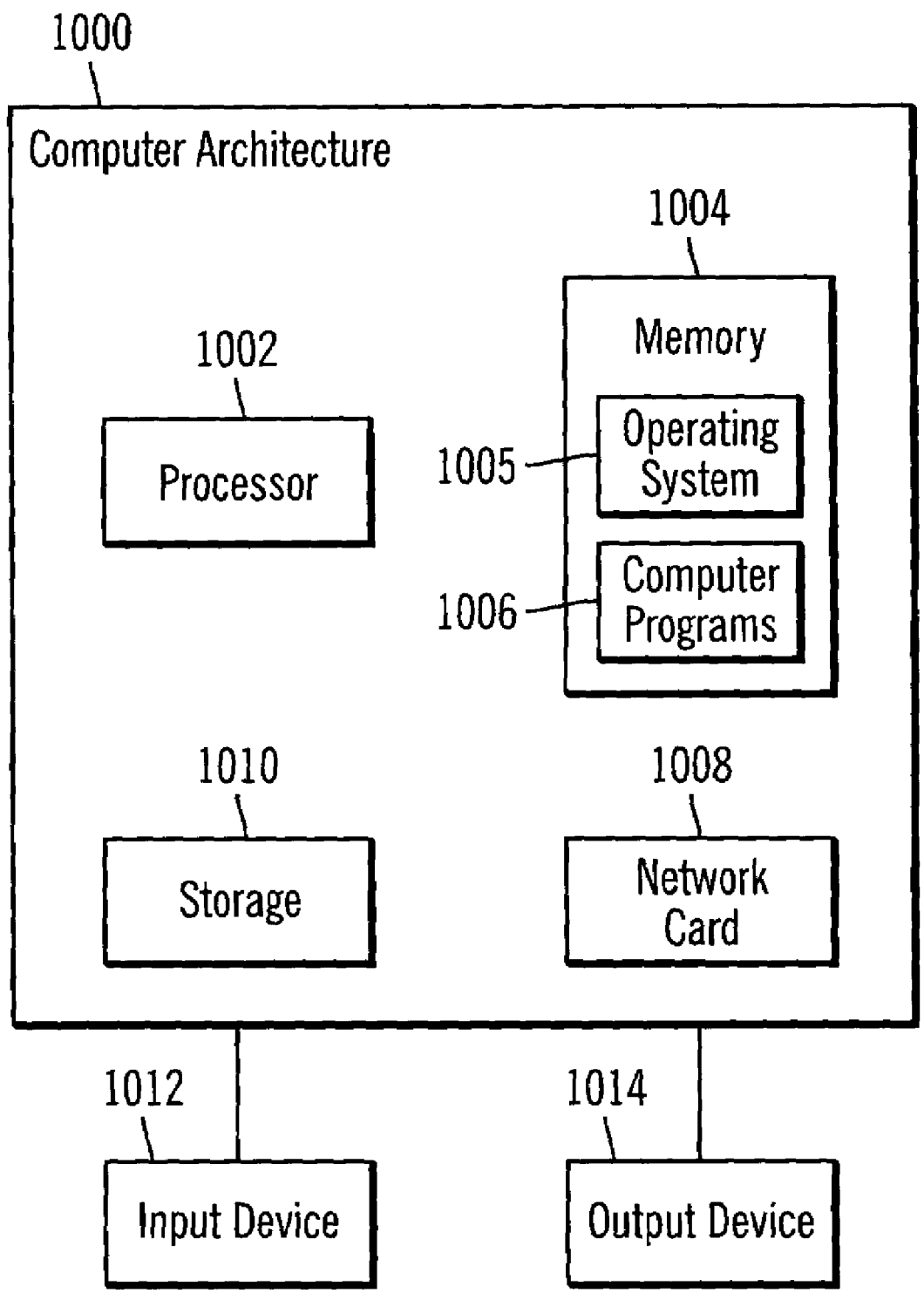
FIG. 10 illustrates an architecture of a computer system that may be used in accordance with certain implementations of the invention.

FIG. 10 illustrates an architecture of a computer system that may be used in accordance with certain implementations of the invention. Computers 100 and/or 120 may implement computer architecture 1000. The computer architecture 1000 may implement a processor 1002 (e.g., a microprocessor), a memory 1004 (e.g., a volatile memory device), and storage 1010 (e.g., a non-volatile storage area, such as magnetic disk drives, optical disk drives, a tape drive, etc.). An operating system 1005 may execute in memory 1004. The storage 1010 may comprise an internal storage device or an attached or network accessible storage. Computer programs 1006 in storage 1010 may be loaded into the memory 1004 and executed by the processor 1002 in a manner known in the art. The architecture further includes a network card 1008 to enable communication with a network. An input device 1012 is used to provide user input to the processor 1002, and may include a keyboard, mouse, pen-stylus, microphone, touch sensitive display screen, or any other activation or input mechanism known in the art. An output device 1014 is capable of rendering information from the processor 1002, or other component, such as a display monitor, printer, storage, etc. The computer architecture 1000 of the computer systems may include fewer components than illustrated, additional components not illustrated herein, or some combination of the components illustrated and additional components.

The computer architecture 1000 may comprise any computing device known in the art, such as a mainframe, server, personal computer, workstation, laptop, handheld computer, telephony device, network appliance, virtualization device, storage controller, etc. Any processor 1002 and operating system 1005 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for input parameter binding, comprising:
at bind time, calculating and storing optimization information in a bind-in structure;
when executing a statement for one of a multiple row insert and a multiple row fetch, when performing bind-in of host variables:
for column array processing for local processing, comparing data in an application structure received with the statement with optimization information in the bind-in structure, wherein the optimization information includes at least one of data type, length, Coded Character Set Identifier, an array size, an indication of whether conversions are required, and an indication of whether the required conversions are valid, wherein the application structure describes data, wherein the application structure is used to store data to be retrieved for a fetch statement, and wherein the application structure is used to provide data to be inserted for an insert statement; and for stream array processing for distributed processing, comparing the optimization information in the bind-in structure with information in a stream flow that includes metadata that is sent with the data;

when there is a match, executing the statement with the optimization information to perform one of fetching data from the data store and inserting data into the data store; and when there is not a match,
regenerating optimization information; and
executing the statement with the regenerated optimization information to perform one of fetching data from the data store and inserting data into the data store.

2. The method of claim 1, further comprising:
for fixed length data,
storing an increment length by which a data pointer that is pointing to data in an application program area is to be incremented to find a location of a next data value; and
calculating the location of the next data value by adding the increment length to the data pointer.

3. The method of claim 1, further comprising:
for distributed processing, at a client computer, calculating a location of data in a client communications buffer.

4. The method of claim 1, further comprising:
for distributed processing, at a server computer, calculating a location of data in a server communications buffer.

5. The method of claim 1, further comprising:
for distributed processing, at a client computer, calculating a location of data in an application program address space.

6. The method of claim 1, further comprising:
when returning a handle to a cursor to a result set from a stored procedure to an application, recalculating the optimization information.

7. The method of claim 1, wherein the statement is for a single row fetch.

8. A method for output parameter binding, comprising:
at bind time, calculating and storing optimization information in a bind-out structure;
when executing a statement for one of a multiple row insert and a multiple row fetch, when performing bind-out of host variables:
for column array processing for local processing, comparing data in an application structure received with the statement with optimization information in the bind-out structure, wherein the optimization information includes at least one of data type, length, Coded Character Set Identifier, an array size, an indication of whether conversions are required, and an indication of whether the required conversions are valid, wherein the application structure describes data, wherein the application structure is used to store data to be retrieved for a fetch statement, and wherein the application structure is used to provide data to be inserted for an insert statement; and for stream array processing for distributed processing, comparing the optimization information in the bind-out structure with information in a stream flow that includes metadata that is sent with the data;

when there is a match, executing the statement with the optimization information to perform one of fetching data from the data store and inserting data into the data store; and when there is not a match,
regenerating optimization information; and executing the statement with the regenerated optimization information to perform one of fetching data from the data store and inserting data into the data store.

9. The method of claim 8, further comprising:
for fixed length data,
storing an increment length by which a data pointer that is pointing to data in an application program area is to be incremented to find a location of a next data value; and
calculating the location of the next data value by adding the increment length to the data pointer.

10. The method of claim 8, further comprising:
for distributed processing, at a client computer, calculating a location of data in a client communications buffer.

11. The method of claim 8, further comprising:
for distributed processing, at a server computer, calculating a location of data in a server communications buffer.

12. The method of claim 8, further comprising:
for distributed processing, at a client computer, calculating a location of data in an application program address space.

13. The method of claim 8, further comprising:
when returning a handle to a cursor to a result set from a stored procedure to an application, recalculating the optimization information.

14. The method of claim 8, wherein the statement is for a single row fetch.

* * * * *